(12) United States Patent
Eckstein et al.

(10) Patent No.: US 8,113,066 B2
(45) Date of Patent: Feb. 14, 2012

(54) CHUCK-INTEGRATED FORCE-MEASURING SYSTEM

(75) Inventors: Martin Eckstein, Puchheim (DE); Guenter Breitkopf, Munich (DE); Richard Huber, Kaufbeuren (DE); Thomas Jaeger, Grafenhausen (DE)

(73) Assignee: pro.micron GmbH & Co. KG, Kaufbeuren (DE)

( * ) Notice: Subject to any disclaimer, the term of this patent is extended or adjusted under 35 U.S.C. 154(b) by 140 days.

(21) Appl. No.: 12/381,985

(22) Filed: Mar. 18, 2009

(65) Prior Publication Data

US 2009/0235763 A1 Sep. 24, 2009

(30) Foreign Application Priority Data

Mar. 19, 2008 (DE) .................. 10 2008 015 005

(51) Int. Cl.
*G01L 3/14* (2006.01)
(52) U.S. Cl. .......... 73/862.321; 73/862.045; 73/862.338
(58) Field of Classification Search ............. 73/862.045, 73/862.21, 862.23, 862.321, 862.338
See application file for complete search history.

(56) References Cited

U.S. PATENT DOCUMENTS

| | | | | |
|---|---|---|---|---|
| 3,781,999 A * | 1/1974 | Colangelo | ................. | 33/641 |
| 4,555,955 A * | 12/1985 | Morgan et al. | ............. | 73/862.06 |
| 5,014,793 A * | 5/1991 | Germanton et al. | .......... | 173/181 |
| 6,536,536 B1 * | 3/2003 | Gass et al. | ......... | 173/2 |
| 6,598,684 B2 * | 7/2003 | Watanabe | ......... | 173/2 |
| 6,834,730 B2 * | 12/2004 | Gass et al. | ......... | 173/2 |
| 7,062,979 B2 * | 6/2006 | Day et al. | ................ | 73/862.22 |
| 7,249,526 B2 * | 7/2007 | Hsieh | ......... | 73/862.21 |
| 7,289,873 B2 * | 10/2007 | Redecker et al. | ............. | 700/174 |
| 7,328,752 B2 * | 2/2008 | Gass et al. | ......... | 173/2 |
| 2004/0182175 A1 * | 9/2004 | Day et al. | ................ | 73/862.21 |
| 2007/0012121 A1 * | 1/2007 | Hsieh | ......... | 73/862.21 |
| 2009/0016834 A1 * | 1/2009 | Scrimshaw et al. | ........... | 408/139 |
| 2009/0248038 A1 * | 10/2009 | Blumenkranz et al. | ....... | 606/130 |

FOREIGN PATENT DOCUMENTS

DE 90 14 037 U1 12/1990
EP 1 323 495 A 7/2003

* cited by examiner

*Primary Examiner* — Freddie Kirkland, III
(74) *Attorney, Agent, or Firm* — Davidson, Davidson & Kappel, LLC

(57) ABSTRACT

A chuck-integrated force-measuring system for determining cutting forces at the cutting tool tip of a rotating tool, for example a drill or milling cutter having at least one measuring sensor, as well as a measured-value processing station. The at least one measuring sensor is designed as a strain sensor which is placeable on a tool holder of a machine tool. A measuring hub assembly is also provided which is insertable as an adapter piece into the chuck of the machine tool and is designed with its own chuck for receiving the tool, the at least one measuring sensor being integrated in the adapter piece.

10 Claims, 2 Drawing Sheets

CHUCK-INTEGRATED FORCE-MEASURING SYSTEM

Priority is claimed to German Patent Application DE 10 2008 015 005.3, filed Mar. 19, 2008, the entire disclosure of which is hereby incorporated by reference herein.

BACKGROUND

The present invention relates to a chuck-integrated force-measuring system for determining cutting forces at the cutting-tool tip of a rotating tool having at least one measuring sensor, as well as a measured-value processing station.

When working with machine tools, such as NC machines, the execution of a machining process, for example the cutting removal of material by turning, drilling, milling, broaching, etc., is reflected in the time sequence of specific physical quantities, such as the cutting force and/or feed force. By recording and evaluating these quantities, the process can then be monitored with regard to the quality of the result (intelligent analysis of measurement signals). On this basis, it is likewise possible to control the process by considering specific, variable process parameters, such as speed, feed force, respectively feed rate, etc., in accordance with specific criteria, for example machining quality, machining time, etc., as well as in accordance with a combination of such criteria.

In this case, the force that is exerted at the machining point (or the cutting edge) of the tool on the workpiece is considered to be a particularly important, information-bearing physical quantity. It is important to know this cutting force as precisely as possible in terms of magnitude and direction, also in the context of those machining methods which employ rotating spindles (for example, drilling, milling, etc.). Of primary importance in this context is the magnitude of the force—also of interest is the resulting direction in the fixed coordinate system.

A fundamental difficulty arises with regard to recording this force using measuring technology. The force is generated at the point of cutting engagement with an instantaneous magnitude and direction that are dependent on the cutting geometry and the control thereof relative to the workpiece surface and the contour thereof.

A complete acquisition of the resulting force requires determining the same in three directions in the fixed coordinate system. This can be accomplished theoretically due to the physical law of "actio=reactio," using the appropriate measuring sensors either on the workpiece or the tool. In practice, however, there are substantial differences in the measuring results.

From a technical standpoint, it is easily feasible to provide a mounting attachment to accommodate the measuring sensors on the workpiece. However, it is not economically practical in production practice since the workpiece must be clamped on a special measuring table having installed force sensors. Moreover, particularly in the context of dynamic forces, on the one hand, the mass of the workpiece functions as a low-pass filter which attenuates the higher-frequency signal content and, on the other hand, the necessarily finite mass of the measuring table falsifies the signal. Depending on the size of the masses involved, these effects limit the validity of the measurement to a specific frequency band or even preclude a direct analysis without having to first perform a complex model analysis of the entire system.

If the force measurement is carried out at the tool in order to avoid the above problems, the following difficulties arise:

Direct measurements using force sensors at the cutting-tool tip, for example, necessitate appropriate structural design measures for the machine tool. Thus, an appropriate installation space for the measuring technology is to be provided, which is not sufficiently available when working with conventional machining equipment. Therefore, at the present time, these types of measurements are performed, at most, in highly specialized laboratory systems, which can only be used under very restrictive conditions and, therefore, have only little practical significance.

Thus, from the related art in accordance with the enclosed FIG. 1, what is generally referred to as a tool-torque sensing system for drilling machines is known, which is composed of a rotor 60 that is attachable to the spindle of a tool holder, and of a stator 62 which is mounted in a contactless configuration around the rotor 60. The rotor 60 measures the torque that is applied to the rotating drilling tool and transmits the measured values in a contactless process to the stator 62. Moreover, it is optionally possible to also pick off the feed force at the tool holder spindle.

As is discernible from FIG. 1, the rotor 60 is located at the output spindle of the machine tool above the tool chuck. Thus, this related art also requires that an appropriate space be provided for attaching the rotor 60.

In the light of this related art, an object of the present invention is to provide a force-measuring system, in particular for machine tools having a rotating spindle, which will offer an enhanced functionality, for instance in terms of a more comprehensive usability and more precise measuring results.

SUMMARY OF THE INVENTION

This objective may be achieved by a chuck-integrated force-measuring system having the features of the present invention. Accordingly, the central idea of the present invention is to place at least one measuring sensor, in the form of a strain sensor, on a tool holder of a machine tool. For this purpose, a measuring hub assembly is advantageously provided, which is insertable as an adapter piece or intermediate piece into the chuck of the machine tool and is designed with its own chuck for receiving the tool, the at least one measuring sensor being integrated in the adapter piece.

Thus, the essential principle underlying the present invention is that the force sought is determined from the strains occurring in the tool holder. Strains resulting from bending and torsional moments arising from the force at the cutting-tool tip occur, namely, at the surface of the holder. However, these strains are not measured by the strain-measuring sensor directly at the cutting-tool holder, i.e., the chuck or the output spindle of the machine tool; rather, the strain-measuring sensors are placed as an external component on a measuring hub assembly. The tool is inserted with a defined angular correlation into this hub assembly, while the measuring hub assembly, in turn, is accommodated by the clamping chuck of the machine tool spindle. The following advantages may be attained by employing this measure:

The instantaneous force at the cutting-tool tip may be determined in terms of magnitude and direction by the strain sensing.

The measuring hub assembly may be used for a plurality of different tools or machine tools. A cost and time savings is hereby derived.

The machine dynamics at the clamping point of the tool are not substantially changed. The measuring accuracy is thereby enhanced.

The measuring hub assembly does not require any installation space or any disturbing stator parts within the range of action of the machine spindles above the tool chuck.

BRIEF DESCRIPTION OF THE DRAWINGS

The present invention is clarified in greater detail in the following on the basis of a preferred exemplary embodiment and with reference to the accompanying drawings.

DETAILED DESCRIPTION

Figure 1:
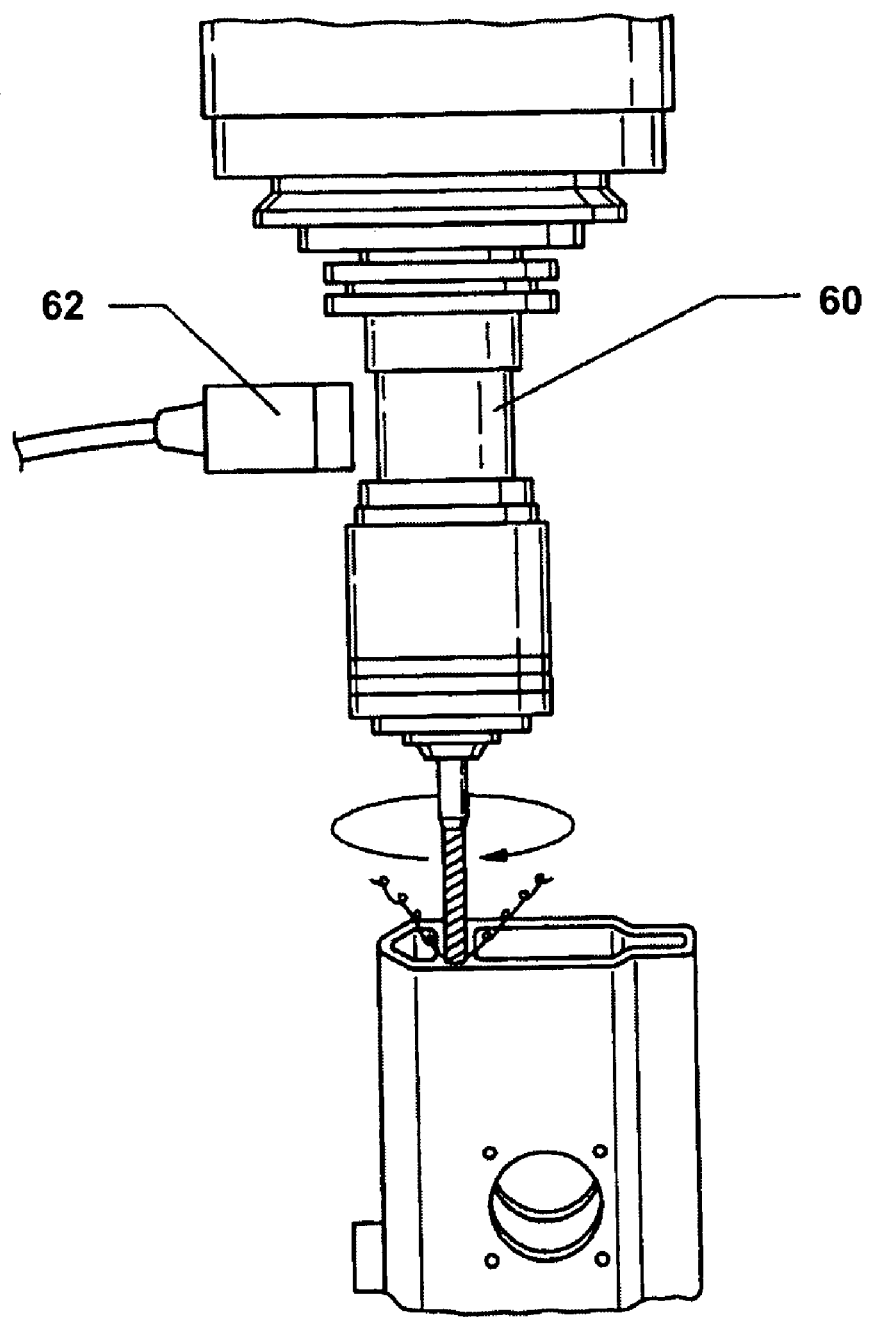
FIG. 1 shows the basic design of a measuring system for measuring torques at the output spindle of a drilling machine in accordance with the related art.
Figures 2, 3:
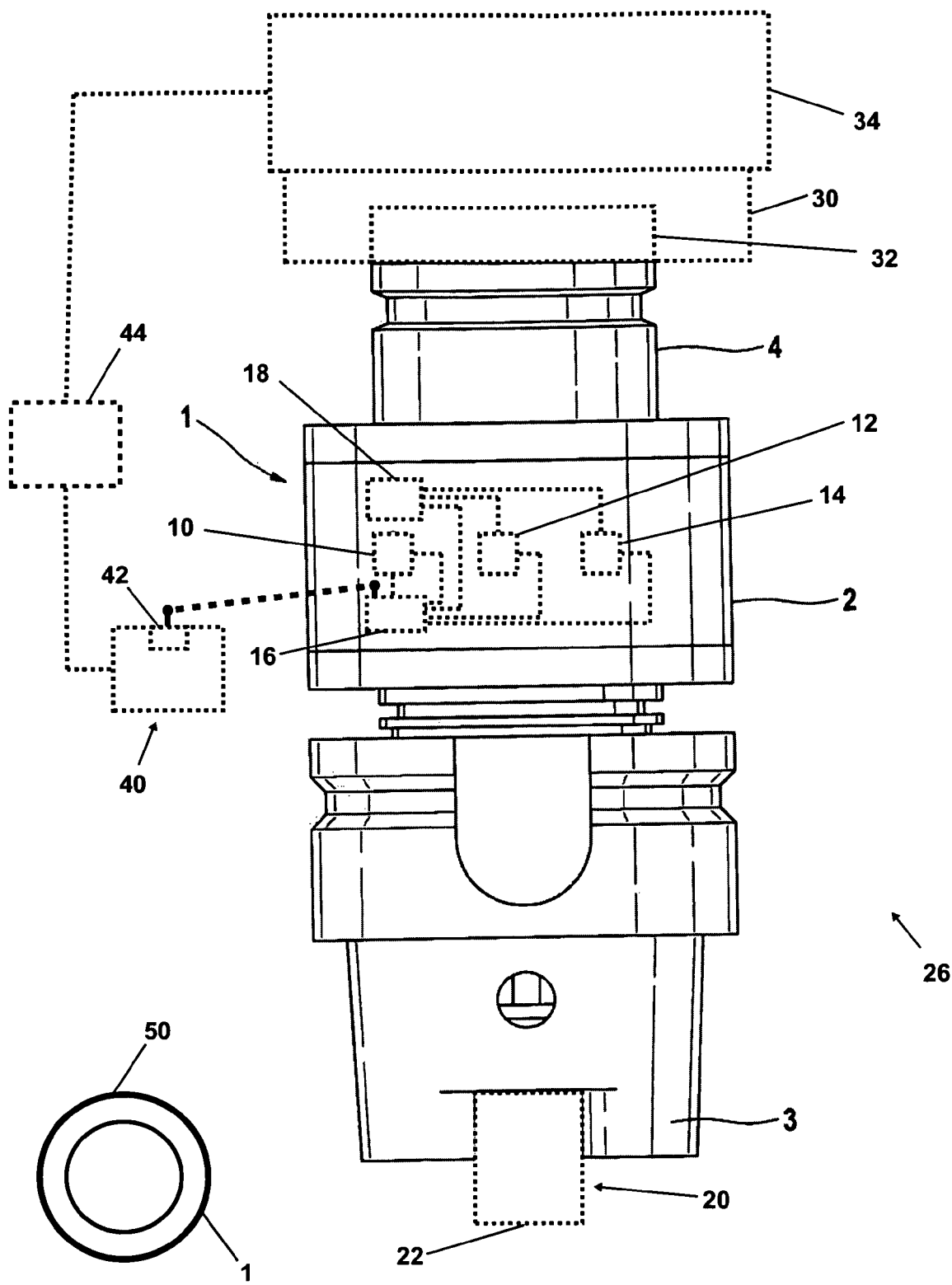
FIG. 2 shows the lateral view of a chuck-integrated force-measuring system in accordance with the preferred exemplary embodiment of the present invention.
FIG. 3 shows a top plan view of a rotating hub assembly and induction coil of a chuck-integrated force-measuring system according to another embodiment of the present invention.

In accordance with FIG. 2, the chuck-integrated force-measuring system of the present invention is composed of a measuring hub assembly 1 which is equipped with a number of strain-measuring sensors 10, 12, 14 (shown schematically). In this context, measuring hub assembly 1 is composed of an essentially cylindrical main body 2, to whose enveloping surface, the strain-measuring sensors are affixed. At the mutually opposing end faces of main body 2, on the one hand, an internal chuck 3 is configured for receiving a rotating tool 20, for example a drill or a milling cutter (shown schematically) and, on the other hand, an insert in the form of a cylindrical extension 4 is provided, which is insertable into a chuck 32 of a machine tool spindle 30. Thus, measuring hub assembly 1 constitutes an adapter piece or intermediate piece which is interposed in the torque or force output of a machine tool 34 onto the tool 20.

In accordance with the preferred exemplary embodiment of the present invention, a measured-value transmitting device 16, as well as an internal energy supply in the form of a battery 18 are accommodated in main body 2 of measuring hub assembly 1. The measured-value transmitting device 16 includes an electrical circuit for preprocessing the signals emitted by the measuring sensors 10, 12, 14, as well as a transponder for the radio transmission of the preprocessed signals to a stationary signal-processing station 40. As shown in a top plan view in FIG. 3, alternatively to the internal energy supply, it is also possible, however, for the electrical energy to be coupled in inductively through a corresponding arrangement of an induction coil 50 into rotating hub assembly 1. In this case, a stator part near measuring hub assembly 1 is necessary which is equipped with corresponding induction coil 50.

Overall, therefore, in its mass distribution and stiffness, measuring hub assembly 1 is designed in such a way that the total stiffness of the drivetrain of the machine spindle 30 is not substantially changed. Measuring errors may be hereby substantially suppressed.

The signal-processing station 40, which is shown schematically in FIG. 2, has a receiver 42 which picks up the strain measurement signals emitted by measuring hub assembly 1. Moreover, the signal-processing station 40 is linked to the machine control 44 and, in particular, to the speed control of the machine tool, in order to thereby obtain information on the angular position of the chuck that is internal to the machine. Alternatively or additionally, however, at least one permanent-signal or pulsed-signal transmitter, whose signal is recorded by a fixed sensor in response to maximally approaching the same, may be accommodated in measuring hub assembly 1, preferably on the periphery thereof. In this context, the number of signal transmitters conforms with the temporal variations in the force in the spatially fixed system which are to be recorded.

As a basic principle, the measured strains are in a complex functional relationship with the instantaneous cutting force and may be described by a system of equations and determined in accordance therewith. However, the solution to this equation is not readily apparent.

A force, which acts on a cutting-tool tip 22 constantly in terms of magnitude and position in the fixed coordinate system, occurs as a periodically changing variable having an initially unknown allocation to a fixed angular position due to the rotation of the tool 20 at every possible measuring point on the tool 20, respectively of the co-rotating tool holder 26 (in this case, the measuring hub assembly 1). In the case of a force that is not constant in terms of spatial fixation, this variation in the mentioned periodic time function is mutually superposed at the tool 20.

Therefore, to obtain a unique solution to the preceding equation, it is necessary to define the instantaneous rotational position of the spindle using a specific clock-pulse rate which is tuned to the frequency range of the force in question. For this purpose, the mentioned signal transmitters are distributed over the periphery of the measuring hub assembly 1 at suitably predefined angular distances, and/or the selected angular positions are read out from the machine control.

However, due to the trigonometric functions involved, the system of equations, which may be formulated for the resulting force that is sought, is not linear. Even when fast computers in accordance with the current state of technological development are used, the computing time required to solve the non-linear system of equations is so long that it is not possible to solve the same in quasi real time in the manner required. For that reason, a numerical approximation method is applied to determine the force from the measured strains. For this, what are commonly known as simulated neural networks are preferably used, as are already known from the related art. In this context, for a sufficient number of load cases, the relationship between the force in terms of magnitude and direction and the corresponding magnitude of the measuring sensor signals is determined mathematically and/or empirically as a function of the angular position of the tool. A simulated neural network is then trained using these cases. The network topology is designed in accordance with the desired accuracy of results.

Finally, in accordance with the generally known approach used in practical applications when working with simulated neural networks of this type, the signals output from the strain-measuring sensors are finally applied to the input of the already trained network, and the corresponding force is queried in terms of magnitude and direction at the network output.

It is only through the use of simulated neural networks that the greatest share of the requisite computational work is first performed quasi "offline" prior to the practical use by the network training. Accordingly, in practical applications, the network query requires relatively little computing capacity. Thus, variable forces at the cutting tip may be determined with virtually any given accuracy within a frequency band that is relevant for assessing the drilling or milling process.

What is claimed is:

1. A chuck-integrated force-measuring system for determining cutting forces at a cutting-tool tip of a rotating tool comprising:
   at least one strain sensor; and
   a measured-value processing station; and
   a measuring hub assembly insertable as an adapter piece into a chuck of a machine tool, the measuring hub assembly including an internal chuck for receiving the rotating tool, the at least one strain sensor being located on the measuring hub assembly.

2. The chuck-integrated force-measuring system as recited in claim 1 wherein the at least one strain sensor is mounted at a surface of the measuring hub assembly to record surface strains resulting from bending and torsional moments arising from cutting forces at the cutting-tool tip.

3. The chuck-integrated force-measuring system as recited in claim 1 further comprising a measuring hub assembly-integrated transmitter for transmitting measuring signals to a stationary receiver of the measured-value processing station.

4. The chuck-integrated force-measuring system as recited in claim 3 further comprising a measuring hub assembly-integrated energy supply for the at least one strain sensor and the transmitter.

5. The chuck-integrated force-measuring system as recited in claim 4 wherein the energy supply is a battery.

6. The chuck-integrated force-measuring system as recited in claim 3 further comprising a stationary induction coil surrounding the measuring hub assembly for inductively coupling electrical energy into the measuring hub assembly.

7. The chuck-integrated force-measuring system as recited in claim 3 further comprising a stator for receiving the signals from the signal transmitter and for determining at least one of a measuring hub speed and an angular position based on the received signals, the at least one signal transmitter being at a periphery of the measuring hub assembly.

8. The chuck-integrated force-measuring system as recited in claim 1 wherein the measured-value processing station is linkable to a machine control to pick off at least one of a current speed and an angular position of the rotating tool.

9. The chuck-integrated force-measuring system as recited in claim 1 wherein the measuring hub assembly includes an extension insertable into the chuck on a side opposite the internal chuck.

10. The chuck-integrated force-measuring system as recited in claim 9 wherein the extension is cylindrical.

* * * * *